(12) United States Patent
Lee et al.

(10) Patent No.: US 11,734,168 B2
(45) Date of Patent: Aug. 22, 2023

(54) STORAGE DEVICE AND OPERATING METHOD THEREOF

(71) Applicant: SK hynix Inc., Icheon-si (KR)

(72) Inventors: Seung Yong Lee, Icheon-si (KR); Eui Cheol Lim, Icheon-si (KR); Myoung Seo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/339,491

(22) Filed: Jun. 4, 2021

(65) Prior Publication Data

US 2022/0164280 A1 May 26, 2022

(30) Foreign Application Priority Data

Nov. 26, 2020 (KR) .................. 10-2020-0161252

(51) Int. Cl.
| | |
|---|---|
| *G06F 12/02* | (2006.01) |
| *G06F 12/0882* | (2016.01) |
| *G06N 3/04* | (2023.01) |
| *G06F 13/16* | (2006.01) |
| *G06F 12/06* | (2006.01) |

(52) U.S. Cl.
CPC ...... *G06F 12/0238* (2013.01); *G06F 12/0646* (2013.01); *G06F 12/0882* (2013.01); *G06F 13/1668* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 11,442,666 B2 * | 9/2022 | Sikarwar | G06F 3/064 |
| 2011/0252187 A1 * | 10/2011 | Segal | G06F 12/0246 |
| | | | 711/E12.008 |
| 2013/0311712 A1 * | 11/2013 | Aso | G06F 12/0246 |
| | | | 711/103 |
| 2017/0270403 A1 | 9/2017 | Zhang | |
| 2021/0142154 A1 * | 5/2021 | Pang | G06N 3/063 |
| 2021/0182077 A1 * | 6/2021 | Chen | G06V 10/82 |
| 2022/0121914 A1 * | 4/2022 | Huang | G06N 3/04 |

FOREIGN PATENT DOCUMENTS

KR 101041837 B1 6/2011

* cited by examiner

*Primary Examiner* — Charles J Choi
(74) *Attorney, Agent, or Firm* — Perkins Coie LLP (57) ABSTRACT

A storage device can be designed to reduce latency in a read operation. Such a storage device can include: a memory device including a plurality of pages that include a first page and a second page different from the first page, each page including a plurality of memory cells that are configured to store data; and a memory controller in communication with the memory device and for sequentially storing result values of a function with respect to a plurality of input values in the plurality of memory cells, and controlling the memory device to store a result value in a last area of the first page and a start area of the second page.

18 Claims, 7 Drawing Sheets

STORAGE DEVICE AND OPERATING METHOD THEREOF

CROSS-REFERENCE TO RELATED APPLICATION

This patent document claims priority to and benefits of the Korean patent application number 10-2020-0161252, filed on Nov. 26, 2020, which is incorporated herein by reference in its entirety.

TECHNICAL FIELD

The technology and implementations disclosed in this patent document generally relates to an electronic device, and more particularly, to a storage device and an operating method thereof.

BACKGROUND

Storage devices refer to electronic components that are configured to store data on a permanent or temporary basis. Each storage device may include one or more storage medium to store data and operate based on a request from a host device such as a computer or a smart phone. The storage device may include a storage medium for storing data and may further include a memory controller for controlling the storage medium to store or retrieve data. The memory device used as a storage medium is classified into a volatile memory device and a nonvolatile memory device.

A volatile memory device may store data only when power is supplied. Thus, such a volatile memory device loses its data in the absence of power. The volatile memory device may include a Static Random Access Memory (SRAM), a Dynamic Random Access Memory (DRAM), or others.

The nonvolatile memory device can retain its data in the absence of power. The nonvolatile memory device may include a Read Only Memory (ROM), a Programmable ROM (PROM), an Electrically Programmable ROM (EPROM), an Electrically Erasable ROM (EEROM), a flash memory, or others.

SUMMARY

Embodiments provide a storage device capable of reducing latency in a read operation and an operating method of the storage device.

In one aspect of the disclosed technology, there is provided a storage device including: a memory device including a plurality of pages that include a first page and a second page different from the first page, each page including a plurality of memory cells that are configured to store data; and a memory controller in communication with the memory device and configured to sequentially store result values of a function with respect to a plurality of input values in the plurality of memory cells, and control the memory device to store a result value in a last area of the first page and a start area of the second page, and wherein the last area of the first page corresponds to an area to which data is stored last in the first page and the start area of the second page corresponds to an area to which data is stored first in the second page.

In another aspect of the disclosed technology, there is provided a memory controller for controlling a memory device including a plurality of pages each including a plurality of memory cells, the memory controller including: a memory device controller configured to sequentially store result values of a function with respect to a plurality of input values in the plurality of memory cells, and control the memory device to store a result value in a last area of a page and an area of a next page that is subsequent to the page, wherein the last area of the page corresponds to an area to which data is stored last in the page; and a computation controller configured to calculate a result value of the function with respect to a target input value by using the result values.

In another aspect of the disclosed technology, there is provided a storage device including: a memory device including a plurality of pages each including a plurality of memory cells that are configured to store data; and a memory controller in communication with the memory device and configured to sequentially store result values of a function with respect to a plurality of input values in the plurality of memory cells, and control the memory device to consecutively store some result values in two consecutive pages.

BRIEF DESCRIPTION OF THE DRAWINGS

Example embodiments will now be described with reference to the accompanying drawings.

DETAILED DESCRIPTION

The specific structural or functional description disclosed herein is merely illustrative for the purpose of describing embodiments according to the concept of the disclosed technology. The embodiments according to the concept of the disclosed technology can be implemented in various forms, and cannot be construed as limited to the embodiments set forth herein.

Figure 1:
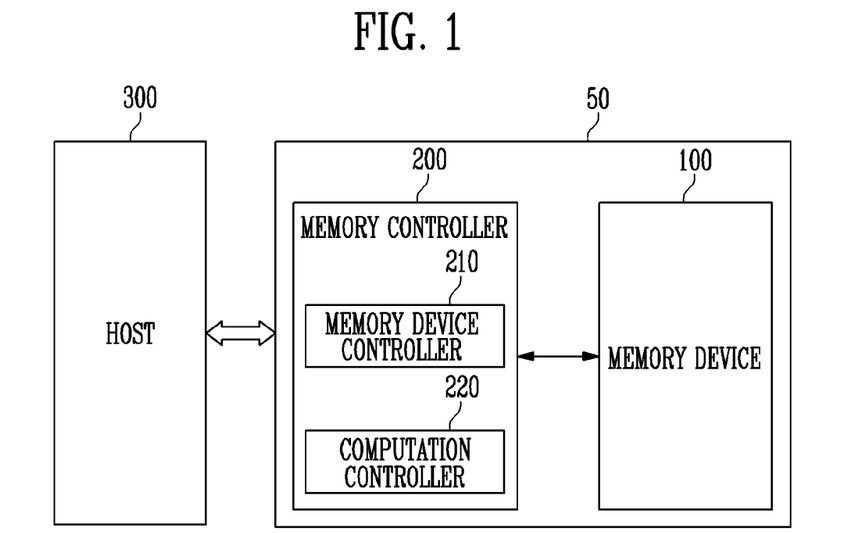
FIG. 1 is a diagram illustrating a storage device in accordance with an embodiment of the disclosed technology.

FIG. 1 is a diagram illustrating a storage device in accordance with an embodiment of the disclosed technology.

Referring to FIG. 1, the storage device 50 may include a memory device 100 and a memory controller 200 for controlling an operation of the memory device 100. The storage device 50 may store data based on the control of a host 300, such as a mobile phone, a smart phone, an MP3 player, a laptop computer, a desktop computer, a game console, a TV, a tablet PC, or an in-vehicle infotainment system.

The storage device 50 may be manufactured as any one of various types of storage devices according to a host interface that is a communication interface between the host 300 and the storage device 50. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, or others.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), or a Wafer-level Stack Package (WSP).

The memory device 100 may store data. The memory device 100 may operate based on the control of the memory controller 200. The memory device 100 may include a memory cell array (not shown) including a plurality of memory cells for storing data.

The memory device 100 may include a plurality of banks for storing data. Each of the plurality of banks may include a memory cell array (not shown) including a plurality of memory cells.

Each of the memory cells may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The memory cell array (not shown) may include a plurality of memory blocks. Each memory block may include a plurality of memory cells. One memory block may include a plurality of pages, each page corresponding to a plurality of memory cells. In an embodiment, an operation for storing data in the memory device 100 or reading data stored in the memory device 100 may be performed on a page basis. The erase operation may be performed on a memory block basis.

In an embodiment, the memory device 100 may be a volatile memory device. For example, the memory device 100 may be a volatile random access memory such as a Dynamic Random Access Memory (DRAM), an SDRAM, a DDR SDRAM, a DDR2 SDRAM, a DDR3 SDRAM, an LPDDR SDRAM, an LPDDR2 SDRAM, or an LPDDR3 SDRAM.

In an embodiment, the memory device 100 may be a nonvolatile memory device. For example, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or others.

In this patent document, some implementations may be explained assuming that the memory device 100 is a DRAM but other implementations are also possible.

The memory device 100 may receive a command CMD and an address ADDR from the memory controller 200, and access an area selected by the address ADDR in the memory cell array. The memory device 100 may perform an operation indicated by the command CMD on the area selected by the address ADDR. For example, the memory device 100 may perform a write operation (program operation), a read operation, and/or an erase operation. In the program operation, the memory device 100 may program data in the zone selected by the address ADDR. In the read operation, the memory device 100 may read data from the zone selected by the address ADDR. In the erase operation, the memory device 100 may erase data stored in the zone selected by the address ADDR.

The memory controller 200 may control overall operations of the storage device 50.

When power is applied to the storage device 50, the memory controller 200 may execute firmware (FW).

In an embodiment, the memory controller 200 may receive data and a Logical Block Address (LBA) from the host 300, and translate the LBA into a Physical Block Address (PBA) representing addresses of memory cells included in the memory device 100, in which data is to be stored. In this specification, the LBA and a "logic address" or "logical address" may be used with the same meaning. In this patent document, the PBA and a "physical address" may be used with the same meaning.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may control at least two memory devices 100. The memory controller 200 may control the memory devices according to an interleaving technique so as to improve operational performance. The interleaving technique may be a method for controlling operations on at least two memory devices 100 to overlap with each other.

In an embodiment, the memory controller 200 may include a memory device controller 210 and a computation controller 220.

The memory device controller 210 may control the memory device 100 based on a request of the host 300.

In an embodiment, the memory device controller 210 may control the memory device 100 to store a function result lookup table in a plurality of pages. The memory device controller 210 may control the memory device 100 to read result values included in the function result lookup table from the plurality of pages. The function result lookup table may include result values of a function with respect to a plurality of input values. In an embodiment, the input values may be consecutive values. In one example, the function may be an activation function of a neural network, but other implementations are also possible. Thus, the function can be any one of various functions.

In an embodiment, the memory device controller 210 may control the memory device 100 to sequentially store result values of a function with respect to a plurality input values in a plurality of memory cells. In some implementations, the memory device controller 210 may control the memory device 100 to read the result values of the function from the plurality of memory cells.

In an embodiment, the memory device controller 210 may control the memory device 100 to store some result values in two consecutive pages.

For example, the memory device controller 210 may control the memory device 100 to store a result value stored in a last area of a page and in an area of a next page as well. For example, the memory device controller 210 may control the memory device 100 to store the result value stored in the last area of each of the plurality of pages and in a start area of the next page of each of the plurality of pages. In an embodiment, each of the last area and the start area of each of the plurality of pages may include at least one memory cell. For example, when data is sequentially stored in memory cells in a page, data which is stored in the last place is stored in a last area of the page. When data is sequentially stored in memory cells in a page, data which is stored in the first place is stored in a start area of the page. Thus, when data is sequentially stored to a page, a last area of the page corresponds to area to which corresponding data is stored in a last place and a start area of a page corresponds to area to which corresponding data is stored in a first place.

In an embodiment, the memory device controller 210 may determine an address representing a position at which at least two result values corresponding to a target input value among the result values stored in the plurality of pages. The target input value may be a target value for acquiring a result value of a function. For example, the target input value may be calculated by using input data provided from the host 300, a weight corresponding to the input data, and a bias. In an embodiment, the weight and the bias are acquired by learning in advance a learning model including the storage device 50, using a learning data set, and may be information stored in the memory device 100 within the storage device 50.

In some implementations, the memory device controller 210 may control the memory device 100 to read at least two result values corresponding to the target input value from a page corresponding to the determined address among the plurality of pages. The page corresponding to the determined address may be a page in which the at least two result values corresponding to the target input value are stored. In addition, the at least two result values may be result values sequentially stored in the corresponding page. The memory device controller 210 may provide the read at least two result values to the computation controller 220.

The computation controller 220 may perform a neural network computation in one or more layers constituting the neural network. For example, the computation controller 220 may perform a weighted sum computation by using input data, a weight corresponding to the input data, and a bias. Also, the computation controller 220 may calculate a result value with respect to a specific input value by performing computation on the activation function. Nodes included in each layer may be activated or may not be activated according to a result value of the activation function.

In an embodiment, the computation controller 220 may calculate a result value of a function with respect to a target input value by using the function result lookup table. Specifically, the computation controller 220 may calculate the result value of the function with respect to the target input value by using result values stored in the memory device 100. For example, the computation controller 220 may calculate the result value of the function with respect to the target input value by using at least two result values read from the memory device 100.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

Figure 2:
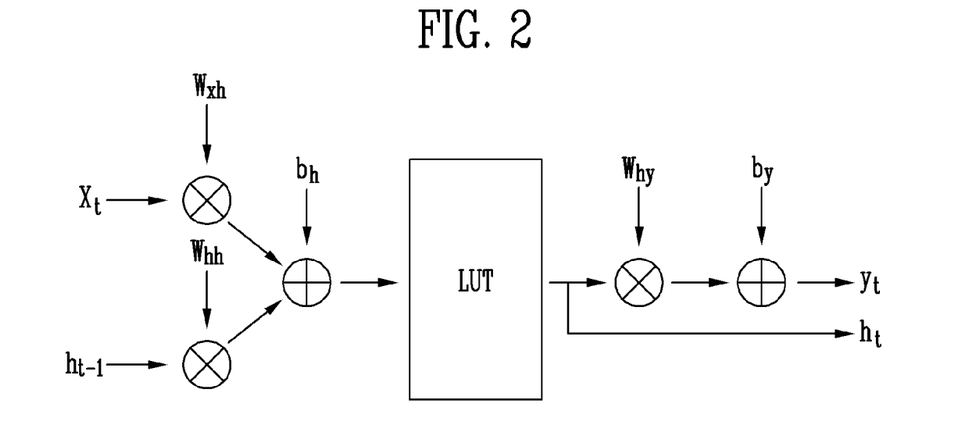
FIG. 2 is a diagram illustrating a neural network computation in accordance with an embodiment of the disclosed technology.

FIG. 2 is a diagram illustrating a neural network computation in accordance with an embodiment of the disclosed technology.

FIG. 2 may be a diagram illustrating, for example, a neural network computation performed in a layer of a Recurrent Neural Network (RNN).

Referring to FIG. 2, the storage device 50 may perform the neural network computation. In an embodiment, the storage device 50 may be configured as, for example, a Processor-In-memory (PIM) storage device.

In an embodiment, the computation controller 220 may compute input data $X_t$ provided from the host 300 and state data $h_{t-1}$ calculated in a previous layer with respective weights $W_{xh}$ and $W_{hh}$. For example, the computation controller 220 may perform a computation of the input data $X_t$ and the weight $W_{xh}$ by using a multiply-accumulation (mac) computation, and perform a computation of the state data $h_{t-1}$ and weight $W_{xh}$. Also, the computation controller 220 may perform an element-wise add computation of a computation result using the input data $X_t$, the state data $h_{t-1}$, and the weights $W_{xh}$ and $W_{hh}$, and a bias $b_h$.

In an embodiment, the computation controller 220 may calculate a result value of an activation function by using a result value of the element-wise add computation as an input value. For example, the computation controller 220 may calculate the result value of the activation function with respect to the input value by using a function result lookup table. Specifically, the computation controller 220 may calculate the result value of the activation function with respect to the input value by using result values stored in the memory device 100. The function result lookup table may include result values of the activation function with respect to a plurality of input values. In an embodiment, the input values may be consecutive values. The function result lookup table may be generated by the host 300, the storage device 50, or another computation device. The function result lookup table may be stored by the memory device 100. In an embodiment, the result value of the activation function, which is calculated by the computation controller 220, may be state data $h_t$ of a current layer. The state data $h_t$ may be transferred to a next layer to be used for a neural network computation of the next layer.

In an embodiment, the computation controller 220 may perform an mac computation of the state data $h_t$ and a weight $W_{hy}$. Also, the computation controller 220 may calculate output data $y_t$ by performing an element-wise add computation of a result value of the mac computation and a bias $b_y$. The output data $y_t$ may be an output value of the current layer. The output data $y_t$ may be provided to the host 300.

Figure 3:
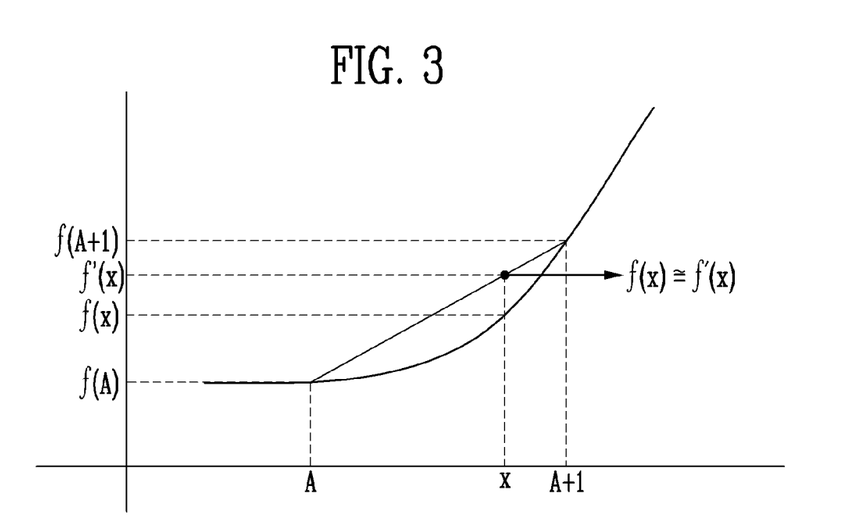
FIG. 3 is a diagram illustrating an example of calculating a result value of an activation function by using interpolation in accordance with an embodiment of the disclosed technology.

FIG. 3 is a diagram illustrating an example of calculating a result value of an activation function by using interpolation in accordance with an embodiment of the disclosed technology.

The horizontal axis of a graph shown in FIG. 3 represents variables, and the vertical axis of the graph represents result values of the activation function with respect to the variables.

The interpolation described with reference to FIG. 3 may be, for example, linear interpolation. However, the interpolation used in the embodiment of the disclosed technology is not limited to the linear interpolation, and may include various interpolations in addition to the linear interpolation.

The activation function may include computations having high computational loads, such as index variable computation and a trigonometric function computation. A device such as an accelerator and a Graphic Processing Unit (GPU) performs a computation on the activation function by using an Arithmetic Logic Unit (ALU). However, since it is difficult for the PIM storage device to use the ALU due to space and power limitations, the computation of the activation function may be performed by using a lookup table.

In an embodiment, the computation controller 220 may calculate a result value of a function with respect to a target input value from at least two result values read from the memory device 1000 by using the interpolation.

For example, a result value f(x) of the activation function with respect to a target input value x may be estimated as a result value f'(x) of the activation value using the interpolation. Therefore, the computation controller 220 may calculate the result value f'(x) of the function with respect to the target input value x by using two result values f(A) and f(A+1) corresponding to the target input value x among result values included in the function result lookup table.

For example, the result value f'(x) of the function with respect to the target input value x may be calculated by using the following Equation 1.

$$f'(x) = f(A) + \frac{f(A+1) - f(A)}{(A+1) - A}(x - A) \quad \text{Equation 1}$$

In Equation 1, A and A+1 denote input values respectively corresponding to the two result values f(A) and f(A+1). In an embodiment, the input values A and A+1 may be input values adjacent to the target input value x among a plurality of input values used to generate the function result lookup table.

As described above, at least two result values are required to calculate the result value of the function by using the function result lookup table. When each of the at least two result values is stored in a separate page, the storage device 50 is to perform a read operation at least twice.

Thus, in accordance with the embodiment of the disclosed technology, a result value stored in a last area of a first page among a plurality of pages is repeatedly stored in a start area of a second page different from the first page among the plurality of pages, so that a result value of the activation function can be calculated through a one-time read operation. Accordingly, the storage device 50 can reduce latency according to the read operation.

Figure 4:
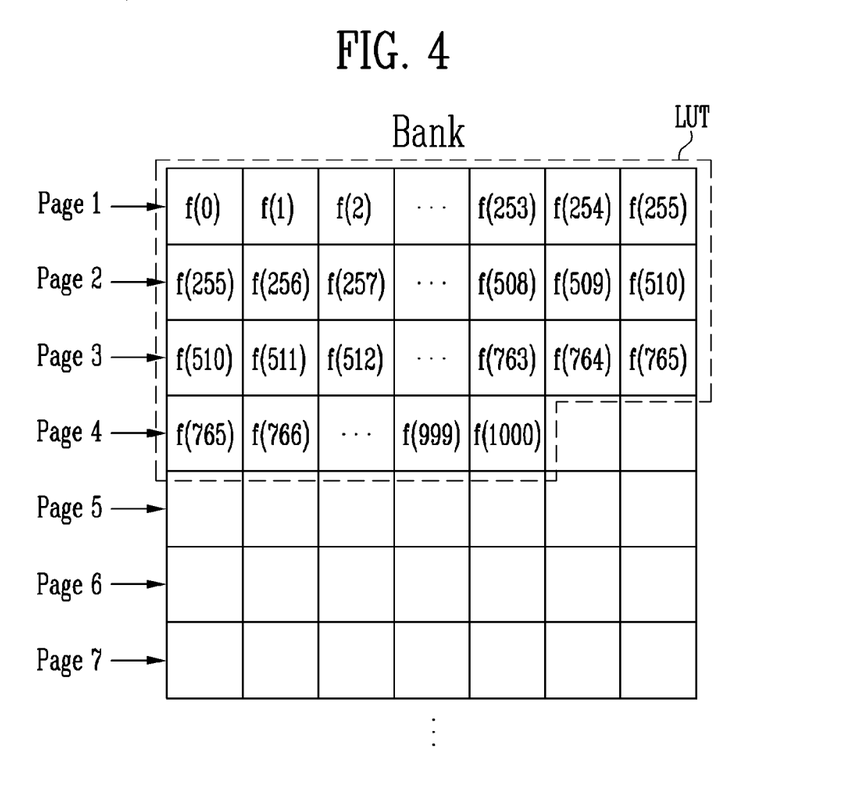
FIG. 4 is a diagram illustrating an example of a look-up table in accordance with an embodiment of the disclosed technology.

FIG. 4 is a diagram illustrating an example of a look-up table in accordance with an embodiment of the disclosed technology.

FIG. 4 may illustrate any one bank Bank among the plurality of banks included in the memory device.

Referring to FIG. 4, the memory device 100 may store a function result lookup table LUT. For example, the function result lookup table LUT may be stored in some of a plurality of pages included in the bank Bank. In some implementations, result values included in the function result lookup table LUT may be stored in a plurality of memory cells included in the plurality of pages. In an embodiment, the function result lookup table LUT may be a lookup table for an activation function.

In an embodiment, each of the plurality of pages may store result values of which number determined according to a precision and a size of data to be stored in each of the plurality of pages among the result values included in the function result lookup table LUT. For example, when the size of data to be stored in each page is 1 KB, and the precision is a floating point 32, 256 result values may be stored in one page.

In addition, a number of pages in which the function result lookup table is stored may be changed according to a size of the function result lookup table. For example, when a number of result values included in the function result lookup table LUT is 1001, the function result lookup table LUT may be stored in four pages Page 1 to Page 4.

In an embodiment, the memory device controller 210 may control the memory device 100 to sequentially store result values of a function with respect to a plurality of input values in a plurality of memory cells included in a plurality of pages. For example, when the function result lookup table LUT stores result values f(0) to f(1000) of a function with respect to 0 to 1000 as consecutive input values, the memory device controller 210 may control the memory device 100 to store the result values in a plurality of memory cells included in a plurality of pages Page 1 to Page 4 in an order from the result value f(0) corresponding to the input value 0 to the result value f(1000) corresponding to the input value 1000. That is, the order in which a result is stored may become earlier as an input value corresponding to the result value becomes smaller.

In an embodiment, the memory device controller 210 may control the memory device 100 to store a result value stored in a last area of a first page among the plurality of pages in a start area of a second page different from the first page among the plurality of pages. In an embodiment, the second page may be a next page of the first page. Each of the last area of the first page and the start area of the second page may include at least one memory cells. In some implementations, the last area of the first page may include one or more memory cells among memory cells included in the first page. The start area of the second page may include one or more memory cells among memory cells included in the second page.

In an embodiment, the memory device controller 210 may control the memory device 100 to repeatedly store the result value f(255) stored in the last area of the first page Page 1 in the start area of the second page Page 2. Also, the memory device controller 210 may control the memory device 100 to repeatedly store the result value f(510) stored in a last area of the second page Page 2 in a start area of a third page Page 3. Also, the memory device controller 210 may control the memory device 100 to repeatedly store the result value f(765) stored in a last area of the third page Page 3 in a start area of a fourth page Page 4. Therefore, a result value stored in a last area of each of a plurality of pages Page 1 to Page 3 in which the function result lookup table LUT is stored may be equal to that stored in a start area of each of next pages of the plurality of pages Page 1 to Page 3.

Figure 5:
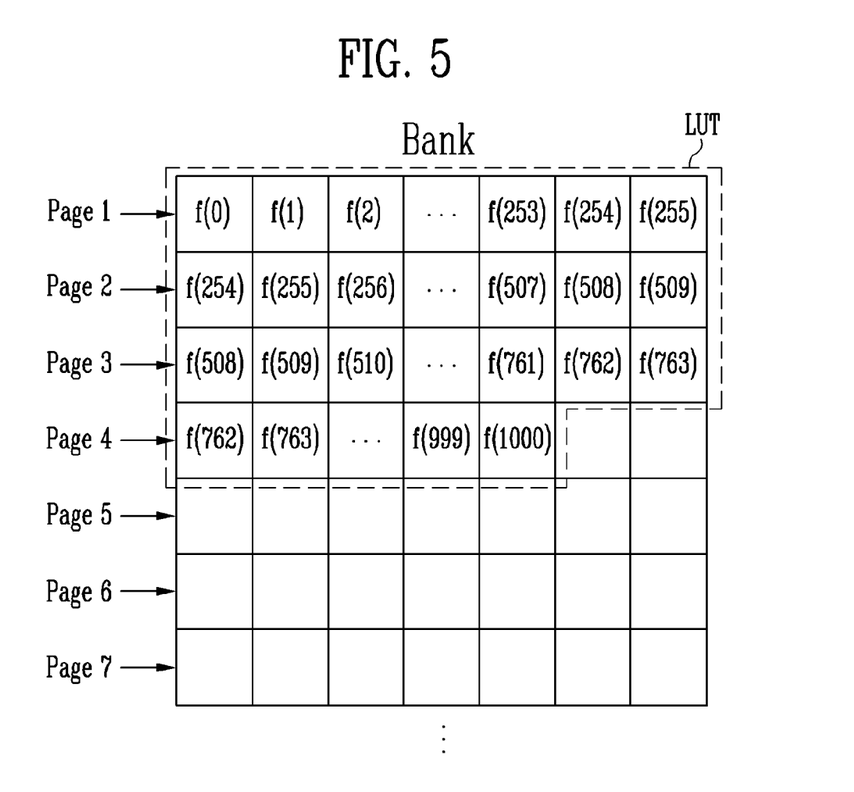
FIG. 5 is a diagram illustrating another example of a look-up table in accordance with an embodiment of the disclosed technology.

FIG. 5 is a diagram illustrating another example of a look-up table in accordance with an embodiment of the disclosed technology.

Referring to FIG. 5, a function result lookup table LUT may be a lookup table for an activation function. As compared with the function result lookup table shown in FIG. 4, the function result lookup table LUT shown in FIG. 5 illustrates a case where a number of result values that have been repeatedly stored in two consecutive pages is 2.

In an embodiment, the memory device controller 210 may control the memory device 100 to sequentially store result values of a function with respect to a plurality of input values in a plurality of memory cells included in a plurality of pages. For example, when the function result lookup table LUT stores result values f(0) to f(1000) of a function with respect to 0 to 1000 as consecutive input values, the memory device controller 210 may control the memory device 100 to store the result values in a plurality of memory cells included in a plurality of pages Page 1 to Page 4 in an order from the result value f(0) corresponding to the input value 0 to the result value f(1000) corresponding to the input value 1000. Thus, the order in which a result is stored may become earlier as an input value corresponding to the result value becomes smaller.

In an embodiment, the memory device controller 210 may control the memory device 100 to store some result values stored consecutively among result values stored in each of a plurality of pages in a next page of each of the plurality of pages.

In an embodiment, the memory device controller 210 may control the memory device 100 to repeatedly store the result values f(254) and f(255) stored consecutively in a first page Page 1 in a second page Page 2. Also, the memory device controller 210 may control the memory device 100 to repeatedly store the result values f(508) and f(509) stored consecutively in the second page Page 2 in a third page Page 3. Also, the memory device controller 210 may control the memory device 100 to repeatedly store the result values f(762) and f(763) stored consecutively in the third page Page 3 in a fourth page Page 4. Therefore, some of result values stored in each of a plurality of pages Page 1 to Page 3 stored in the function result lookup table LUT may be equal to those of result values stored in each of next pages Page 2 to Page 4 of the plurality of pages Page 1 to Page 3.

In an embodiment, result values stored repeatedly in a next page of each of a plurality of pages may be result values having a late order in which the results values are stored in each page. That is, the result values stored repeatedly may be result values having corresponding input values which are large in each page.

Meanwhile, although a case where results values are sequentially stored in a plurality of memory cells, and result values stored repeatedly are stored in a start area of a next page has been exemplified in the above-described embodiment, the disclosed technology is not necessarily limited thereto. For example, the memory device controller 210 may control the memory device 100 to sequentially store result values in a plurality of memory cells and to randomly store result values in each page. Also, the memory device controller 210 may control the memory device 100 not to store result values stored repeatedly in a start area of a next page but to randomly store the result values stored repeatedly.

Also, although a case where a number of result values stored repeatedly in a plurality of pages is 2 has been described in the above-described embodiment, the disclosed technology is not necessarily limited thereto. In some embodiments, a number of result values stored repeatedly in a plurality of pages may be 2 or more.

Figure 6:
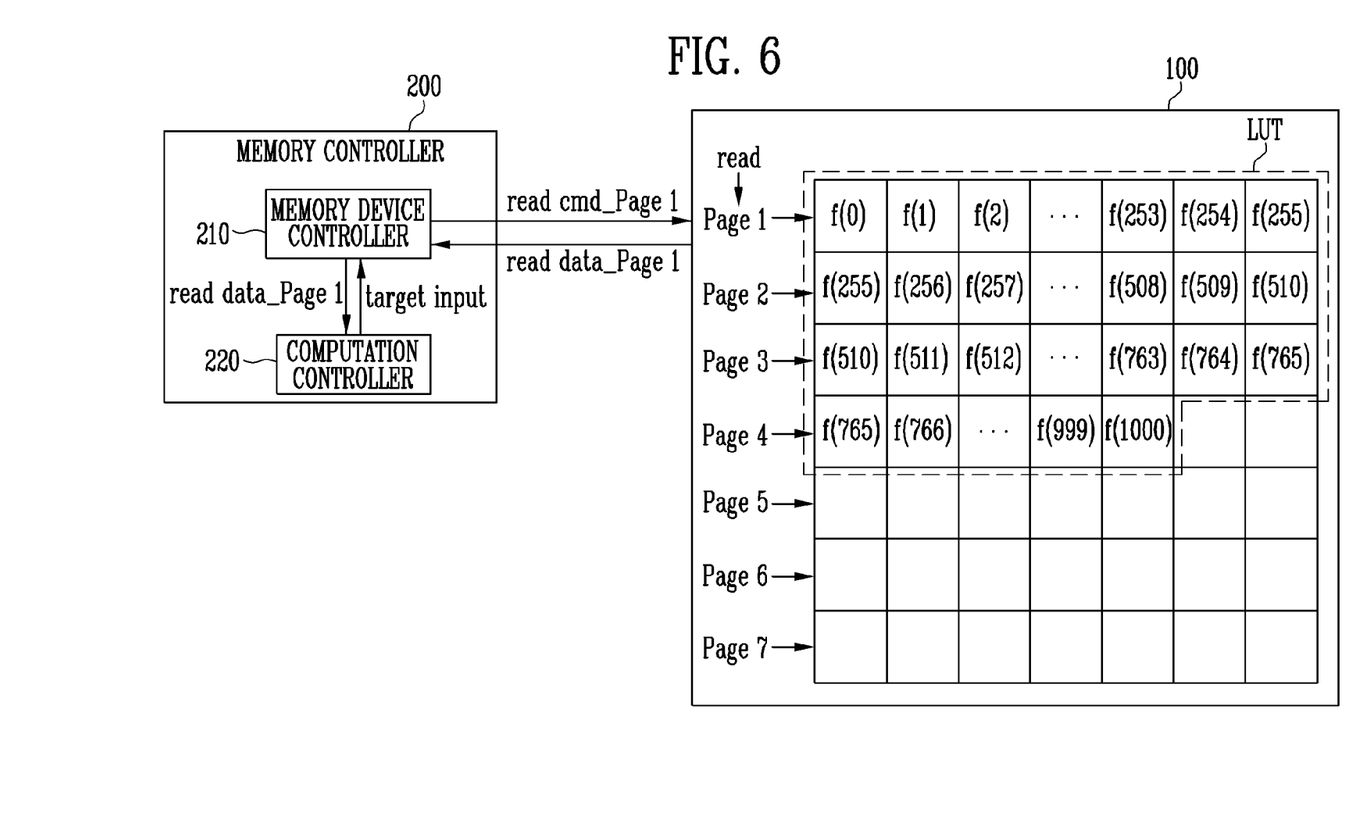
FIG. 6 is a diagram illustrating an example of an operation of calculating a result value of an activation function in accordance with an embodiment of the disclosed technology.

FIG. 6 is a diagram illustrating an example of an operation of calculating a result value of an activation function in accordance with an embodiment of the disclosed technology.

A function result lookup table LUT shown in FIG. 6 may be, for example, the function result lookup table LUT shown in FIG. 4. However, an operation described with reference to FIG. 6 may be applied to the function result lookup table LUT shown in FIG. 5.

In an embodiment, the memory device controller 210 may control the memory device 100 to store the function result lookup table LUT according to a request of the host 300. The memory device 100 may store result values of a function in a plurality of memory cells.

In an embodiment, the computation controller 220 may calculate a result value of the function with respect to a target input value target input by using the function result lookup table LUT. Specifically, the computation controller 220 may calculate the result value of the function with respect to the target input value target input by using the result values stored in the memory device 100.

In an embodiment, the computation controller 220 may calculate the target input value target input by using input data provided from the host 300, a weight corresponding to the input data, and a bias. For example, the computation controller 220 may calculate the target input value target input by using a weighted sum using the input data, the weight corresponding to the input data, and the bias. Subsequently, the computation controller 220 may provide the target input value target input to the memory device controller 210. Meanwhile, in FIG. 6, it is assumed that the target input value target input is 254.5.

In an embodiment, the memory device controller 210 may control the memory device 100 to read at least two result values corresponding to the target input value target input among result values from any one page among a plurality of pages. The at least two result values corresponding to the target input value target input may be result values used to calculate the result value of the function with respect to the target input value target input. Also, the at least two result values corresponding to the target input value target input may be result values stored consecutively. In an embodiment, the one page may be a page in which the at least two result values corresponding to the target input value target input are all stored among the plurality of pages.

In an embodiment, the memory device controller 210 may determine an address representing a position at which the at least two result values corresponding to the target input value target input among the result values included in the function result lookup table LUT are stored. In an embodiment, the address representing the position at which the result values are stored may be configured with a sign bit, an integer bit, and a fraction bit. Specifically, the memory device controller 210 may determine the address according to a size of the target input value target input. For example, the memory device controller 210 may determine that input values adjacent to the target input value target input are 254 and 255, and determine that a position at which result values f(254) and f(255) corresponding to the input values 254 and 255 are stored is a first page Page 1.

In an embodiment, the memory device controller 210 may control the memory device 100 to read at least two result values from a page corresponding to the determined address among the plurality of pages. Subsequently, the memory device controller 210 may provide the memory device 100 with an address corresponding to the first page Page 1 and a read command read cmd_Page 1 for the first page Page 1. The memory device controller 210 may receive read data read data_Page 1 from the memory device 100. The read data read data_Page 1 may include the result values f(254) and f(255) used to calculate the result value of the function with respect to the target input value target input. The memory device controller 210 may provide the read data read data_Page 1 to the computation controller 220.

In an embodiment, the computation controller 220 may calculate the result value of the function with respect to the target input value target input by using the at least two result values f(254) and f(255) from the memory device 100. For example, the computation controller 220 may calculate the result value of the function with respect to the target input value target input by using interpolation. Specifically, the computation controller 220 may calculate the result value of the function with respect to the target input value target input by using the at least two result values f(254) and f(255) as variables of the interpolation.

Figure 7:
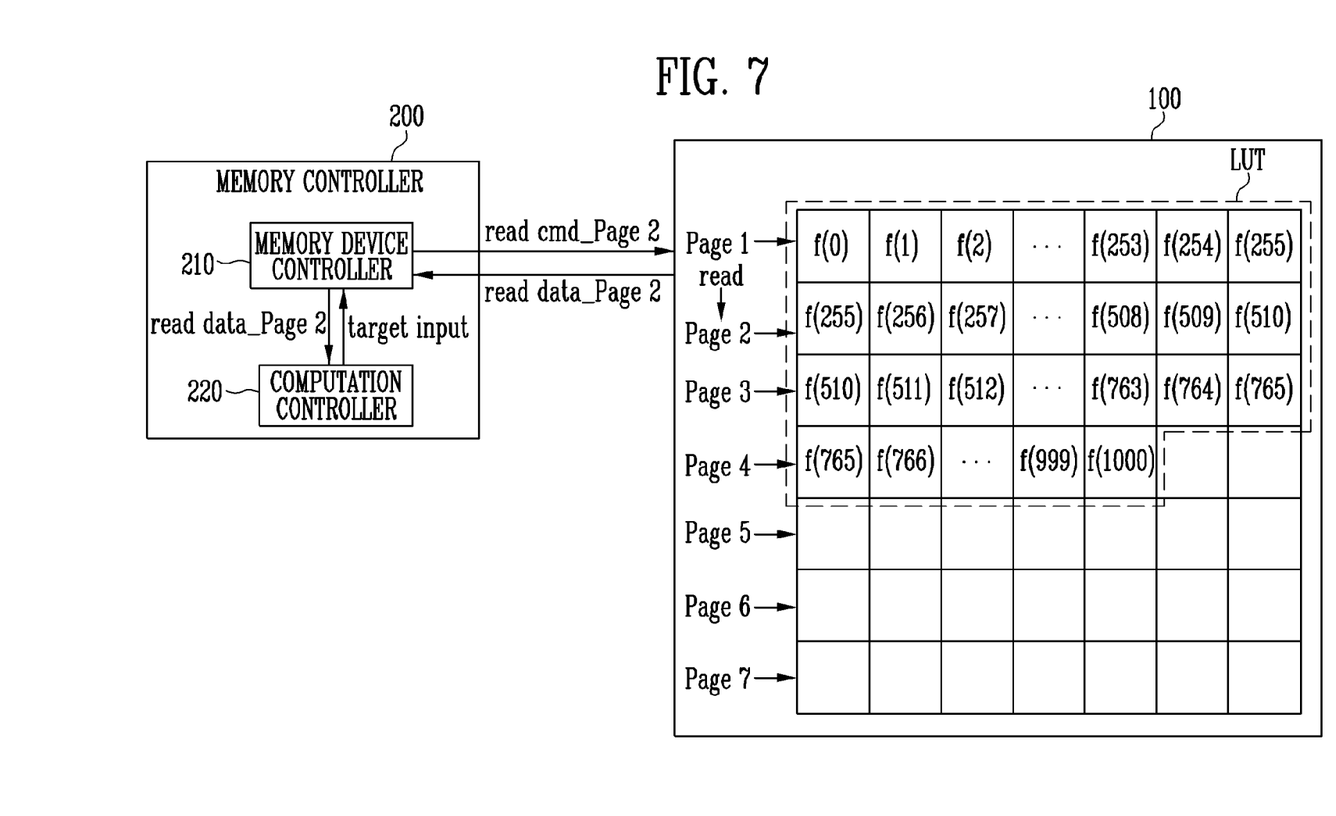
FIG. 7 is a diagram illustrating another example of an operation of calculating a result value of an activation function in accordance with an embodiment of the disclosed technology.

FIG. 7 is a diagram illustrating another example of an operation of calculating a result value of an activation function in accordance with an embodiment of the disclosed technology.

A function result lookup table LUT shown in FIG. 7 may be, for example, the function result lookup table LUT shown in FIG. 4. However, an operation described with reference to FIG. 7 may be applied to the function result lookup table LUT shown in FIG. 5.

In an embodiment, the memory device controller 210 may control the memory device 100 to store the function result lookup table LUT according to a request of the host 300. The memory device 100 may store result values of a function in a plurality of memory cells.

In an embodiment, the computation controller 220 may calculate a result value of the function with respect to a target input value target input by using the function result lookup table LUT. Specifically, the computation controller 220 may calculate the result value of the function with respect to the target input value target input by using the result values stored in the memory device 100.

In an embodiment, the computation controller 220 may calculate the target input value target input by using input data provided from the host 300, a weight corresponding to the input data, and a bias. For example, the computation controller 220 may calculate the target input value target input by using a weighted sum using the input data, the weight corresponding to the input data, and the bias. Subsequently, the computation controller 220 may provide the target input value target input to the memory device controller 210. Meanwhile, in FIG. 7, it is assumed that the target input value target input is 255.5.

In an embodiment, the memory device controller 210 may control the memory device 100 to read at least two result values corresponding to the target input value target input among result values from any one page among a plurality of pages. The at least two result values corresponding to the target input value target input may be result values used to calculate the result value of the function with respect to the target input value target input. Also, the at least two result values corresponding to the target input value target input may be result values stored consecutively. In an embodiment, the one page may be a page in which the at least two result values corresponding to the target input value target input are all stored among the plurality of pages.

In an embodiment, the memory device controller 210 may determine an address representing a position at which the at least two result values corresponding to the target input value target input among the result values included in the function result lookup table LUT are stored. In an embodiment, the address representing the position at which the result values are stored may be configured with a sign bit, an integer bit, and a fraction bit. In an embodiment, when a result value stored first of all among the at least two result values is stored in a last area of a first page, the memory device controller 210 may control the memory device 100 to read the at least two result values from a second page. Specifically, the memory device controller 210 may determine the address according to a size of the target input value target input. For example, the memory device controller 210 may determine that input values adjacent to the target input value target input are 255 and 256. Since a result value f(255) corresponding to the input value 255 between result values f(255) and f(256) corresponding to the input values 255 and 256 is stored in the last area of the first page Page 1, the memory device controller 210 may determine, as the second page Page 2, a position at which the result values f(255) and f(256) corresponding to the input values 255 and 256 are stored.

In an embodiment, the memory device controller 210 may control the memory device 100 to read at least two result values from a page corresponding to the determined address among the plurality of pages. Subsequently, the memory device controller 210 may provide the memory device 100 with an address corresponding to the second page Page 2 and a read command read cmd_Page 2 for the second page Page 2. The memory device controller 210 may receive data read data_Page 2 read from the memory device 100. The read data read data_Page 2 may include the result values f(255) and f(256) used to calculate the result value of the function with respect to target input value target input. The memory device controller 210 may provide the read data read data_Page 2 to the computation controller 220.

In an embodiment, the computation controller 220 may calculate the result value of the function with respect to the target input value target input by using the at least two result values f(255) and f(256) from the memory device 100. For example, the computation controller 220 may calculate the result value of the function with respect to the target input value target input by using interpolation. Specifically, the computation controller 220 may calculate the result value of the function with respect to the target input value target input by using the at least two result values f(255) and f(256) as variables of the interpolation.

Accordingly, in the embodiment of the disclosed technology, a result value stored in a last area of a first page among a plurality of pages is repeatedly stored in a start area of a second page different from the first page among the plurality of pages, so that a result value of the activation function can be calculated through a one-time read operation, thereby reducing latency of the read operation.

Figure 8:
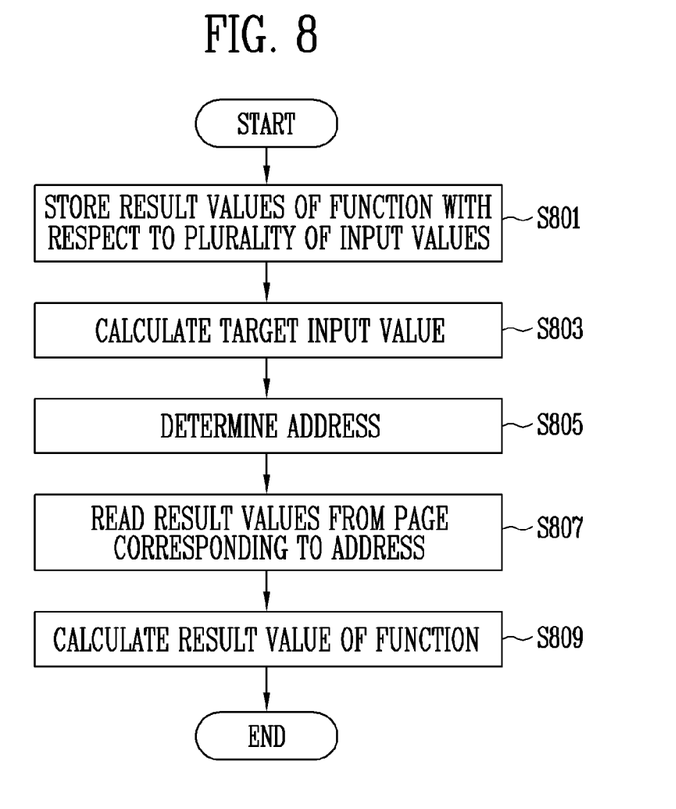
FIG. 8 is a diagram illustrating an operating method of a storage device in accordance with an embodiment of the disclosed technology.

FIG. 8 is a diagram illustrating an operating method of a storage device in accordance with an embodiment of the disclosed technology.

The operating method shown in FIG. 8 may be performed by, for example, the storage device 50 shown in FIG. 1.

Referring to FIG. 8, in step S801, the storage device 50 may store result values of a function with respect to a plurality input values in a plurality of memory cells.

The storage device 50 may sequentially store result values included in a function result lookup table in the plurality of memory cells. Also, the storage device 50 may repeatedly store a result value stored in a last area of a first page among a plurality of pages in a start area of a second page different from the first page among the plurality of pages.

In step S803, the storage device 50 may calculate a target input value by using input data provided from the host 300, a weight corresponding to the input data, and a bias.

In step S805, the storage device 50 may determine an address representing a position at which at least two result values corresponding to the target input value among the result values are stored.

In step S807, the storage device 50 may read the at least two result value from a page corresponding to the determined address among the plurality of pages.

In step S809, the storage device 50 may calculate a result value of the function with respect to the target input value by using the at least two result values.

Figure 9:
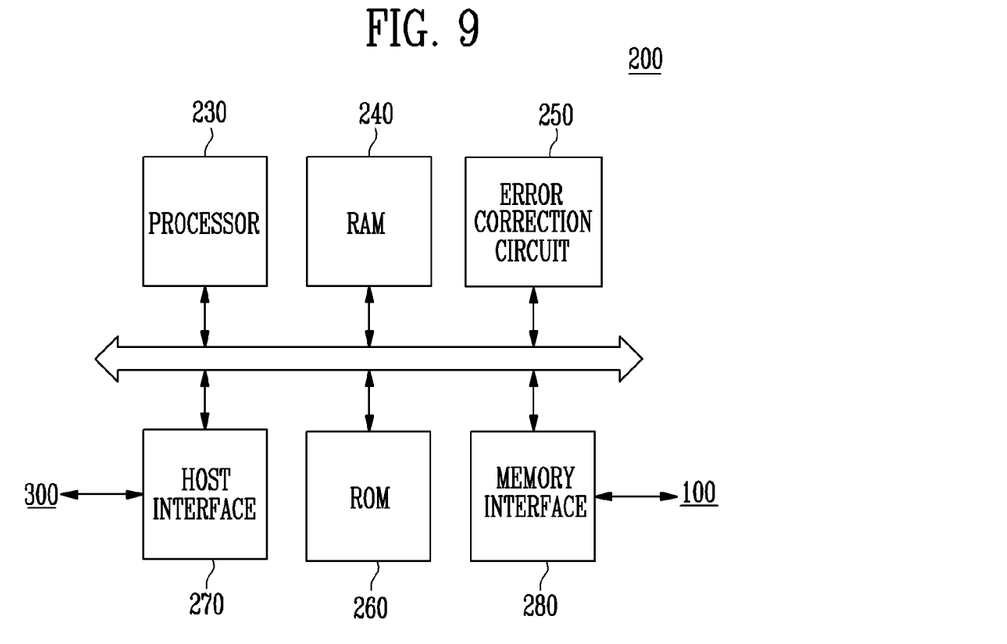
FIG. 9 is a diagram illustrating a memory controller shown in FIG. 1.

FIG. 9 is a diagram illustrating the memory controller shown in FIG. 1.

Referring to FIGS. 1 and 9, the memory controller 200 may include a processor 230, a RAM 240, an error correction circuit 250, ROM 260, a host interface 270, and a memory interface 280.

The processor 230 may control overall operations of the memory controller 200. The RAM 240 may be used as a buffer memory, a cache memory, a working memory, etc. of the memory controller 200.

The error correction circuit 250 may perform error correction. The error correction circuit 250 may perform ECC encoding, based on data to be written to the memory device 100 through the memory interface 280. The ECC-encoded data may be transferred to the memory device 100 through the memory interface 280. The error correction circuit 250 may perform ECC decoding on data received through the memory interface 280 from the memory device 100. Exemplarily, the error correction circuit 250 may be included as a component of the memory interface 280 in the memory interface 280.

The ROM 260 may store, in the form of firmware, various information required in an operation of the memory controller 200. In an example, the memory device controller 210 and the computation controller 220, which are shown in FIG. 1, may be firmware stored in the ROM 260.

The memory controller 200 may communicate with an external device (e.g., the host 300, an application processor, or the like) through the host interface 270.

The memory controller 200 may communicate with the memory device 100 through the memory interface 280. The memory controller 200 may transmit a command, an address, a control signal, and the like to the memory device 100 through the memory interface 280, and receive data.

In accordance with the disclosed technology, there can be provided a storage device capable of reducing latency in a read operation and an operating method of the storage device.

While the disclosed technology has been shown and described with reference to certain exemplary embodiments thereof, it will be understood by those skilled in the art that various changes in form and details may be made therein without departing from the spirit and scope of the disclosed technology as defined by the appended claims and their equivalents. Therefore, the scope of the disclosed technology should not be limited to the above-described exemplary embodiments but should be determined by not only the appended claims but also the equivalents thereof.

Only exemplary embodiments of the disclosed technology have been described in the drawings and specification. Various modifications and enhancements to the disclosed embodiments and other embodiments can be made based on what is described or/and illustrated in this patent document.

What is claimed is:

1. A storage device, comprising:
   a memory device including a plurality of pages that include a first page and a second page different from the first page, each page including a plurality of memory cells that are configured to store data; and
   a memory controller in communication with the memory device and configured to sequentially store result values of a function with respect to a plurality of input values in the plurality of memory cells, and control the memory device to store a result value in a last area of the first page and repeatedly store the result value in a start area of the second page,
   wherein the last area of the first page includes at least one memory cell to which data is stored last among a plurality of memory cells included in the first page, and
   wherein the start area of the second page includes at least one memory cell to which data is stored first among a plurality of memory cells included in the second page.

2. The storage device of claim 1, wherein the function is an activation function of a neural network.

3. The storage device of claim 1, wherein the first page and the second page are consecutive pages.

4. The storage device of claim 1, wherein the memory controller includes:
   a memory device controller configured to store the result values in the plurality of memory cells according to a request of a host, and control the memory device to read the result values from the plurality of memory cells; and
   a computation controller configured to calculate a result value of the function with respect to a target input value by using the result values.

5. The storage device of claim 4, wherein the computation controller is configured to calculate the target input value by using input data provided from the host, a weight corresponding to the input data, and a bias.

6. The storage device of claim 4, wherein the memory device controller is configured to determine an address representing a position at which at least two result values corresponding to the target input value are stored, and control the memory device to read the at least two result values from a page corresponding to a determined address.

7. The storage device of claim 6, wherein the memory device controller is configured to control the memory device to read the at least two result values from the second page in case that a result value that has been stored in a first place among the at least two result values is stored in the last area of the first page.

8. The storage device of claim 6, wherein the computation controller is configured to calculate the result value of the function with respect to the target input value by using the at least two result values.

9. The storage device of claim 8, wherein the computation controller is configured to calculate the result value of the function with respect to the target input value by using an interpolation.

10. The storage device of claim 1, wherein each of the plurality of pages is configured to store result values of which number determined based on a precision and a size of data to be stored in each of the plurality of pages.

11. A memory controller for controlling a memory device including a plurality of pages each including a plurality of memory cells, the memory controller comprising:
- a memory device controller configured to sequentially store result values of a function with respect to a plurality of input values in the plurality of memory cells, and control the memory device to store a result value in a last area of a page and repeatedly store the result value in an area of a next page that is subsequent to the page, wherein the last area of the page includes at least one memory cell to which data is stored last among a plurality of memory cells included in the page, wherein the area of the next page includes at least one memory cell among a plurality of memory cells included in the next page; and
- a computation controller configured to calculate a result value of the function with respect to a target input value by using the result values.

12. The memory controller of claim 11, wherein the memory device controller is configured to control the memory device to store the result value in the last area of the page and a start area of the next page, wherein the start area of the next page includes at least one memory cell to which data is stored first among the plurality of memory cells included in the next page.

13. The memory controller of claim 11, wherein the memory device controller is configured to determine an address representing a position at which at least two result values corresponding to the target input value are stored, and control the memory device to read the at least two result values from a page corresponding to a determined address.

14. The memory controller of claim 13, wherein the computation controller is configured to calculate the result value of the function with respect to the target input value by using the at least two result values.

15. A storage device, comprising:
- a memory device including a plurality of pages each including a plurality of memory cells that are configured to store data; and
- a memory controller in communication with the memory device and configured to sequentially store result values of a function with respect to a plurality of input values in the plurality of memory cells, and control the memory device to store some result values in a last area of a first page and repeatedly store the some result values in an area of a second page different from the first page,
wherein the last area of the first page includes at least one memory cell to which data is stored last among a plurality of memory cells included in the first page, and
wherein the area of the second page includes at least one memory cell among a plurality of memory cells included in the second page.

16. The storage device of claim 15, wherein the memory controller includes:
- a memory device controller configured to store the result values in the plurality of memory cells according to a request of a host, and control the memory device to read the result values from the plurality of memory cells; and
- a computation controller configured to calculate a result value of the function with respect to a target input value by using the result values.

17. The storage device of claim 16, wherein the memory device controller is configured to control the memory device to read at least two result values corresponding to the target input value among the result values from any one page among the plurality of pages.

18. The storage device of claim 17, wherein the computation controller is configured to calculate the result value of the function with respect to the target input value by using the at least two result values.

\* \* \* \* \*